United States Patent [19]

Bell

[11] Patent Number: 5,088,645

[45] Date of Patent: Feb. 18, 1992

[54] SELF-PROGRAMMABLE TEMPERATURE CONTROL SYSTEM FOR A HEATING AND COOLING SYSTEM

[76] Inventor: Ian Bell, 111 Granton Drive, Unit 409, Richmond, Ontario, Canada, L4B 1L5

[21] Appl. No.: 720,249

[22] Filed: Jun. 24, 1991

[51] Int. Cl.$^5$ ............................................. G05D 23/00
[52] U.S. Cl. .................................. 236/46 R; 165/11.1; 236/47
[58] Field of Search .................... 165/12, 11.1; 236/46, 236/47

[56] References Cited

U.S. PATENT DOCUMENTS

| | | | |
|---|---|---|---|
| 4,060,123 | 11/1977 | Hoffman et al. | 165/11.1 |
| 4,095,740 | 6/1978 | Wirth | 236/47 |
| 4,223,831 | 9/1980 | Szarka | 236/47 |
| 4,319,712 | 3/1982 | Bar | 236/47 |
| 4,374,541 | 2/1983 | Hoberman | 165/26 |
| 4,410,131 | 10/1983 | Radtke et al. | 236/10 |
| 4,467,178 | 8/1984 | Swindle | 236/47 X |
| 4,485,864 | 12/1984 | Carrell et al. | 165/11.1 |
| 4,723,593 | 2/1988 | Kuribayashi | 165/11.1 |

FOREIGN PATENT DOCUMENTS 0019344  11/1980  European Pat. Off. .......... 236/46 R Primary Examiner—William E. Wayner

[57] ABSTRACT

The present invention provides for a self-programming temperature control system for automatically adjusting the temperature control setpoint of a heating and cooling system of a space in accordance with the present or anticipated occupancy status of the space. The temperature control system comprises:

a) detecting means for detecting the occupancy status of the space and providing an output of the occupancy status of the space;

b) timing means for providing time intervals to the control system;

c) storage means for storing the output of the detecting means in relation to the time interval provided by the timing means to provide a stored past occupancy record of the space; and d) programmed processor means including programmed instructions for reading and processing the past occupancy record of the space stored in the storage means to derive an anticipated occupancy status for the space and thereby control the temperature of the space in accordance with the programmed instructions and the stored past occupancy record of the space.

14 Claims, 2 Drawing Sheets

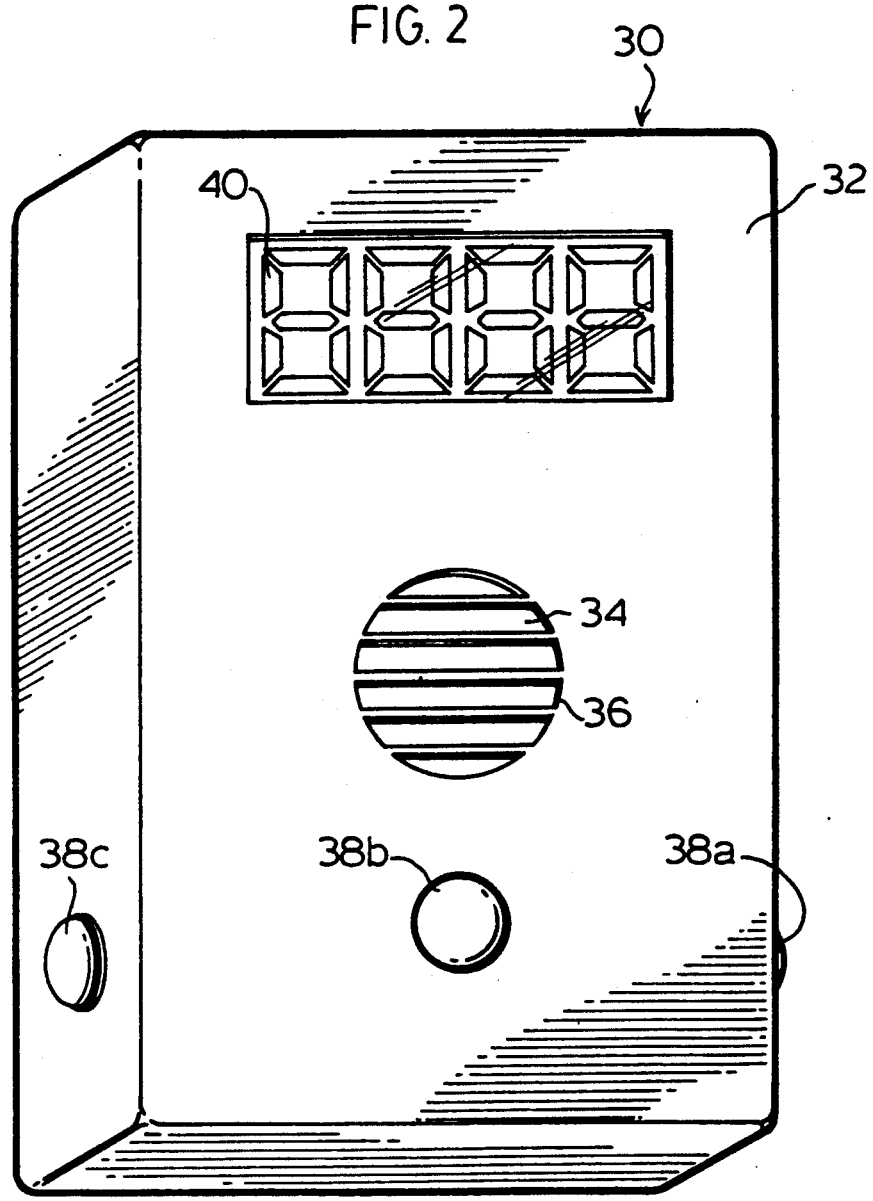

SELF-PROGRAMMABLE TEMPERATURE CONTROL SYSTEM FOR A HEATING AND COOLING SYSTEM

FIELD OF THE INVENTION

The present invention relates to a self-programming temperature control system for automatically adjusting the temperature control setpoint of a heating or cooling system for a space in accordance with the present or anticipated occupancy status of the space.

BACKGROUND OF THE INVENTION

There has been much attention directed recently on the need to conserve natural resources by reducing needless consumption of energy. One of the major uses of energy is environmental temperature sustaining means, in particular, heating and cooling systems which, as a result, are one of the prime targets for energy conservation. Various automated temperature control systems have been developed in attempts to reduce the energy consumption of an environmental heating and cooling system of a space particularly when the space is unoccupied.

One such system is a programmable thermostat wherein the user programs the thermostat in accordance with the expected occupancy status of the space. Thus, for example, in a home heating and cooling system where the homeowner does not expect to be home between the hours of 9:00 a.m. and 5:00 p.m., the thermostat may be programmed to reduce the heating or cooling requirements during those hours. Similarly, in the late night hours when the occupants of the house would be sleeping, the system is also programmed to reduce the heating or cooling requirements during those hours. Thus, the system is programmed to operate at full heating and cooling capacity only during the expected hours of occupation, namely, in the morning between rising and leaving the house and in the evening between arriving home and going to bed. There are, however, drawbacks associated with such systems, one major drawback being that if the space is occupied during the hours from 9:00 a.m. to 5:00 p.m., then it is necessary to override the programming of the programmable thermostat. Additionally, should there be minor variations from the routine on particular days, then it is generally not possible to allow for such variations in the programming of the thermostat. The result is either that the temperature of the space once occupied does not reach the comfort level desired until the heating or cooling system is automatically activated and brings the temperature to the comfort level desired, or, that the heating or cooling system is automatically activated before the space is occupied thereby needlessly wasting energy.

Control systems have also been described wherein the environmental heating and controlling system is set to a first setpoint for when the room is occupied and to a second, more energy efficient setpoint when the room is unoccupied. Sensors are provided to determine when the room is occupied and thereby adjust the heating and cooling system setpoint. However, such systems suffer from the drawback that it will take some time from the initial indication of occupancy of the space until the heating and cooling system can bring the temperature of the space up to the comfort level desired when the space is occupied.

There thus remains a need for a simple but efficient temperature control system which can easily be used and adapted to varying occupancy status of a space.

SUMMARY OF THE INVENTION

The present invention provides for a self-programming temperature control system for automatically adjusting the temperature control setpoint of a heating and cooling system of a space in accordance with the present or anticipated occupancy status of the space. The temperature control system comprises:
  a) detecting means for detecting the occupancy status of the space and providing an output of the occupancy status of the space;
  b) timing means for providing time intervals to the control system;
  c) storage means for storing the output of the detecting means in relation to the time interval provided by the timing means to provide a stored past occupancy record of the space; and
  d) programmed processor means including programmed instructions for reading and processing the past occupancy record of the space stored in the storage means to derive an anticipated occupancy status for the space and thereby control the temperature of the space in accordance with the programmed instructions and the stored past occupancy record of the space.

In an aspect of the invention, there is provided a method for automatically adjusting the temperature control setpoint of a heating and cooling system of a space in accordance with the anticipated occupancy status of the space. The method comprises:
  a) providing a temperature sensing means for sensing the ambient temperature in the space and providing an output of the sensed temperature of the space; a detecting means for detecting the occupancy status of the space and providing an output of the occupancy status of the space; timing means for providing a time interval to the control system; and programmed processor means including programmed instructions;
  b) the processor means being connected to the detecting means, the timing means and the storage means to allow monitoring and processing of the output of the detecting means in relation to the interval provided by the timing means in accordance with the programmed instructions to provide information on the past occupancy status of the space, the processor means further being so connected to allow storing of the information on the past occupancy status of the space in a storage means;
  c) the processor means retrieving the stored information on the past occupancy status of the space from the storage means for the time interval provided by the timing means and processing the information in accordance with the programmed instructions to provide an indication of the anticipated occupancy status of the space for the time interval, the processor means providing a signal to a environmental temperature sustaining means for altering the temperature in the space and providing heating and cooling in accordance with the anticipated occupancy status of the space.

BRIEF DESCRIPTION OF THE DRAWINGS

Preferred embodiments of the invention are shown in the drawing, wherein:

FIG. 2 is a perspective view of a preferred embodiment of a control system of the present invention.

DETAILED DESCRIPTION OF THE PREFERRED EMBODIMENTS

Figure 1:
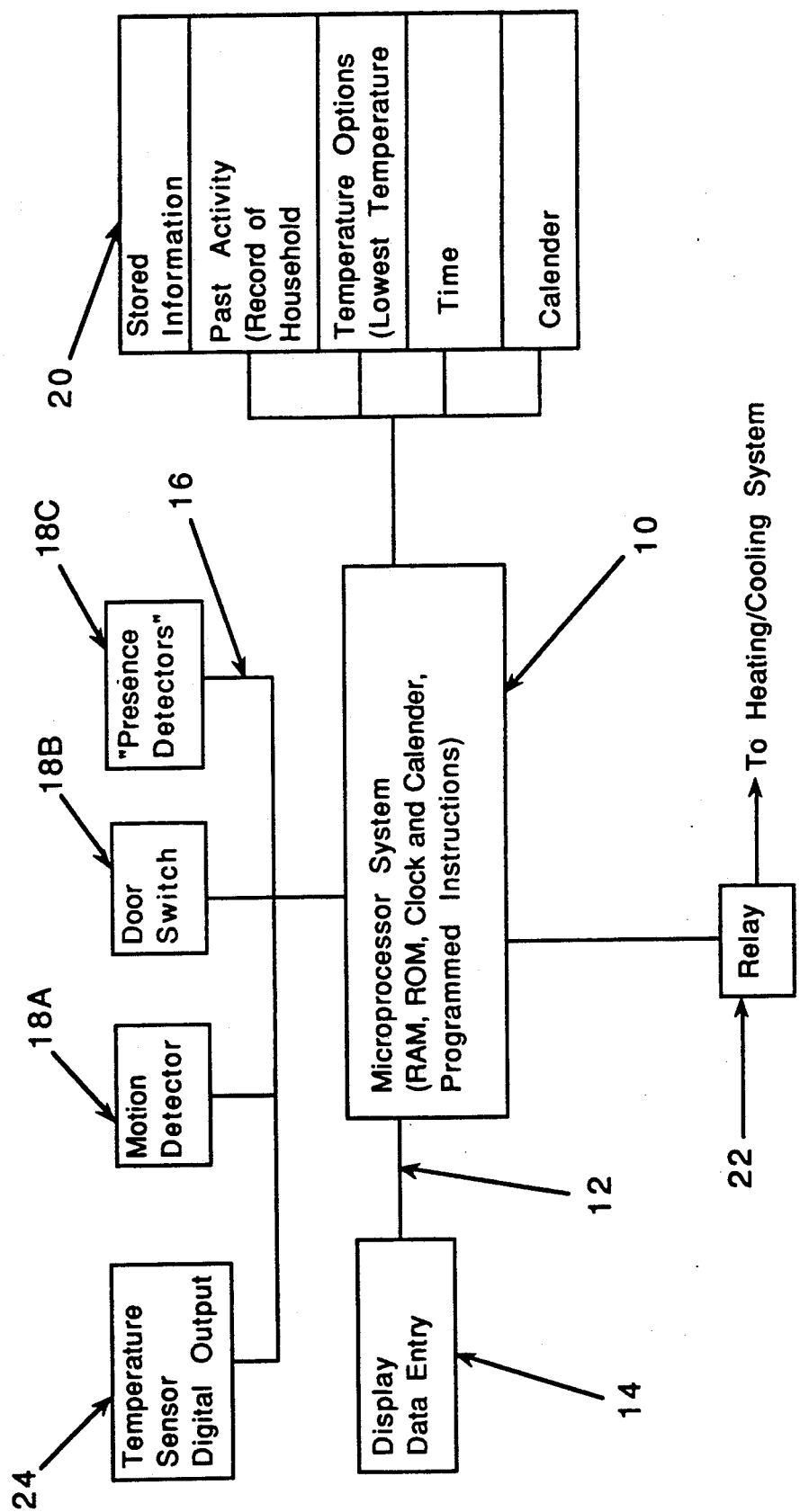
FIG. 1 is a block diagram of a control system of the present invention.

Referring now to FIG. 1, there is shown a block diagram of a preferred embodiment of the control system of the present invention. The control system is adapted to interface with an environmental temperature sustaining means, in particular, a heating and/or cooling system to provide heating and cooling to the space. Such heating and cooling systems can include any of the commonly utilized systems such as, for example, forced air and convection furnaces, heat pumps and any of the commonly utilized air conditioning systems. Such heating and cooling systems are generally controlled by a thermostat having temperature sensing means for detecting the ambient temperature of the space and including temperature setpoints for activation and deactivation of the system. For example, in heating systems the thermostat detects the ambient temperature in the space and when the temperature of the space falls below the setpoint for the activation of the heating function, then the thermostat activates the heating system to provide heat to the space until the temperature rises above the setpoint for the deactivation of the system.

As shown in the block diagram of FIG. 1, the control system of the present invention includes a programmed processor means, preferably a microprocessor 10. The microprocessor 10 is provided with programmed instructions which are preferably contained in read-only memory (ROM) which may be part of the microprocessor chip itself or may be provided by a separate ROM chip. The microprocessor also preferably contains a certain amount of random access memory (RAM) to provide for the various user programmable options of the system such as the temperature setpoint and time intervals as will be explained further hereinbelow. The system also includes timing means for providing timing for the intervals and cycles to the system. Preferably, the timing means is a clock and calendar means for providing time and day of week information for the operation of the system.

Connected to the microprocessor via an input-output bus 12 is a data entry means, preferably either a series of switches for selecting various options or a keyboard entry pad 14 for enabling the user to control and program the system for the various setpoints desired for the heating and cooling system. As well the system may have display means such as LEDs to provide status display of the system. Also connected to the microprocessor 10 via a system bus 16 are one or more detecting means 18 for detecting the occupancy status of the space. The detecting means provide an output of the occupancy status of the space and may be one or more individual detectors such as a door opening detector 18A, motion detector 18B, or other "presence detector" 18C, such as sound detectors, light detectors, units designed to monitor the flow of water through plumbing pipes, or units designed to monitor the voltage loads in the house occurring as a result of the electrical activity in the house.

Preferably the detecting means 18 is adapted to detect abrupt changes in the monitored function. Thus, for example, where the detecting means is a light detector, the control system is set up such that gradual changes in light as would occur in the early morning and late evening would not result in the system detecting that the space is occupied. However, abrupt changes in light as would occur if a person were to switch on the lights in the space or were to pass in front of the detector unit thereby reducing the amount of light reaching the detector would result in the system detecting that the space is occupied. When utilizing light detectors it is also preferred to have more than one detector and to utilize changes in the output of one of the detectors as compared with the others as indicative of occupancy of the space.

Similarly, for example, a unit designed to monitor the voltage loads in the house occurring as a result of electrical activity in the house would be adapted to monitor non-cyclic change or small non-inductive changes on the order of about 100 watts or less. This would eliminate a possible false reading from the normal operations of such appliances as refrigerators which operate automatically independent of the occupancy status of the space. In a preferred embodiment, the voltage load monitor would be connected between the neutral wire and ground in a typical 3-wire household circuit and would monitor the voltage drop between the neutral and ground. As a result of switching on of, for example, light, the monitor would detect the small non-inductive voltage drop between the neutral and ground and the system would indicate occupancy of the space. Appliances such as refrigerators are an inductive load on the electrical system thereby resulting in an extremely large voltage drop when the unit is first switched on and if the system detects such a large initial voltage drop it would not indicate occupancy of the space. It is believed that the use of the light detector or voltage load detector in the manner described above is novel for control of thermostats in general in addition to their use in the thermostat of the present invention.

Preferably the control system will have two or more detecting means 18 connected to the system bus in a manner such that each detecting means is individually addressable by the microprocessor 10 to enable the microprocessor to individually monitor each detecting means. Alternatively, when utilizing a number of different detecting means 18, the detecting means may be connected to the system bus 16 through an OR gate so that a system status of unoccupied will occur only where all detecting means detect no occupancy of the space, as will be explained further hereinbelow.

The system also includes storage means 20 for storing the output of the detecting means in relation to time interval provided by the timing means such as time and day of week information provided by the clock and calendar means, as will be explained further hereinbelow. Also connected to the microprocessor system is an interface such as a relay 22 for interfacing the control system to the heating and cooling system of the space. The control system is also provided with electrical power, commonly the 24 volt line utilized for thermostats and door bells which is rectified and regulated to provide the proper voltage levels for the components of the control system. Additionally, to provide for retention of the memory during possible power failures, the system is provided with battery back-up.

In operation, the control system firstly discerns the past occupancy status of the space as follows. The microprocessor 10 monitors the output of the detecting means 18 to determine the occupancy status of the space at regular intervals during the day. The occupancy status of the space for a given time interval is then stored in the storage means 20 to provide a past activity record of the household. The length of the time interval for determining the occupancy status may be pre-programmed into the system or may be user-programmed at the time of setting up of the system. The interval is chosen to provide a sufficient number of occupancy status outputs and is preferably an interval of one hour or less. The shorter the interval, the smoother will be the temperature transition from a totally unoccupied status to a totally occupied status.

It is preferable that within each time interval, the occupancy status of the space is monitored several times, for example every ten or fifteen minutes in a one hour interval, and that a determination of "unoccupied" will be given only if the space is found to be unoccupied throughout the entire time interval. Most preferably, the occupancy status is continuously monitored throughout the time interval and a determination of "unoccupied" given only if the space is unoccupied throughout the time interval.

At the selected time interval, the microprocessor system 10 determines the occupancy status of the space for the time interval. If the house is occupied, then an on or active signal is stored in the storage means 20 while if the space is unoccupied, then an off or inactive signal is stored in the storage means 20.

The system monitors and stores the occupancy status for each time interval. The system repeats this each day to build up a historical or past occupancy chart based upon a set cycle of a number of days and number of such cycles. Preferably, for ease of operation, the cycle is 7 days or one week in length and the number of such cycles is at least 3. The length and number of cycles is preferably pre-programmed into the system and as explained above, the cycle is generally one week and the system utilizes at least 3 and preferably at least 5 weeks to determine the past occupancy status. However, the system may allow for user-programmable inputs of the number of days in a cycle and number of cycles so that the system may be adapted to a person's particular life style.

For each day of the week, the information on the occupancy status of the space for a given time interval is stored in the storage means 20. Similar information is stored over a several week period, preferably at least 3 weeks, more preferably at least 5 weeks to provide for sufficient information regarding the past occupancy status of the space to enable the system to discern trends in the occupancy status of the space for a given time and day of the week.

The following table illustrates, for example, the occupancy status of a space, namely, a house, for the day of Monday over a previous five-week period in intervals of one hour.

12:00 noon. For each hour of the day, a number is derived based upon the percentage of occupancy of the house for the time period. For example, for a five-week period shown above, the number would be from 0 to 5 depending upon the number of occurrences of occupancy during the five-week period for a particular hour. Thus, in the table above, for example, the hour of 7:00 a.m. would be allocated a number of 4, 8:00 a.m. would receive the number 2, 1:00 p.m. would receive the number 1 and so on.

For each of these derived numbers, a setpoint for heating and cooling is also allocated. These setpoints may be fully pre-programmed into the system or fully user-programmable or some combination of the two. For example, the user may program into the system the highest setpoint for a fully occupied time and the lower interval for a fully unoccupied time. The system could then assign the intermediate values to the temperature setpoints based upon the spread between the lowest and highest temperatures and the number of weeks of stored information utilized for the past occupancy status of the space. Alternatively, the system could be set up such that each of these individual setpoints is user-programmable. Preferably for ease of operation, the system is set up such that the user programs at least the highest and lowest temperature for the range and the number of weeks utilized for determining the past occupancy status and the intermediate values are assigned by the system on the basis of the user-entered information and the programmed instructions.

In such a situation the system can derive the intermediate setpoints by simply dividing the temperature integral between the highest and lowest temperature by the number of weeks utilized for the past occupancy status of the space. Alternatively, if the range is very large, for example, in the order of 10° to 15° C., then the intermediate setpoints may be derived unequally such that the difference in the temperature setpoint between an occupancy status of 0 and an occupancy status of 1 may be larger than the other intermediate setpoints. For example, for the heating setpoints, if the lowest temperature is 10° C. and the highest is 23° C., then for an occupancy status of 0 the temperature would be 10°, for an occupancy status of 1, the temperature setpoint could be 15° for an occupancy status of 2, the temperature setpoint could be 17°, for an occupancy status 3 of, the temperature setpoint could be 19°, for an occupancy status of 4, the temperature setpoint could be 21°, and for an occupancy status of 5, the temperature setpoint could be 23°.

The microprocessor 10 also controls the temperature setpoint of the system in accordance with the present or anticipated occupancy status of the space as follows: for any particular time interval, when the system detects that the space is unoccupied, the system checks the stored values assigned for that time interval on the basis

| | | | | | | | | | | | | | | | | | | | | | | | |
|---|---|---|---|---|---|---|---|---|---|---|---|---|---|---|---|---|---|---|---|---|---|---|---|
| Week 5 | 1 | 1 | 1 | 1 | 1 | 1 | 1 | 1 | 0 | 0 | 0 | 0 | 0 | 0 | 0 | 0 | 0 | 1 | 1 | 1 | 1 | 1 |
| Week 4 | 1 | 1 | 1 | 1 | 1 | 1 | 1 | 1 | 0 | 0 | 0 | 0 | 0 | 0 | 0 | 0 | 1 | 1 | 1 | 1 | 1 | 1 |
| Week 3 | 1 | 1 | 1 | 1 | 1 | 1 | 1 | 1 | 0 | 0 | 0 | 0 | 0 | 0 | 0 | 0 | 1 | 1 | 0 | 0 | 1 | 1 |
| Week 2 | 1 | 1 | 1 | 1 | 1 | 1 | 1 | 1 | 0 | 0 | 0 | 0 | 0 | 0 | 0 | 0 | 0 | 1 | 1 | 1 | 1 | 1 |
| Week 1 | 1 | 1 | 1 | 1 | 1 | 1 | 1 | 1 | 1 | 0 | 0 | 0 | 0 | 0 | 0 | 0 | 0 | 0 | 0 | 0 | 1 | 1 |
| Hours | 12 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| | { | | | | AM | | | | | | | } | { | | | | | PM | | | | | } |
| | | | | | | | MONDAY LAST 5 WEEKS | | | | | | | | | | | | | | | | |

From the above table, it can be seen that for the five-week period information stored, the house was always occupied between 12:00 a.m. and 6:00 a.m. and the house was always empty between 9:00 a.m. and of the past activity and adjusts the temperature in the space in accordance with those values. For example, in the above circumstance, on Monday of the next week if no one is home at 5:00 a.m., the temperature will be set to 23°, at 7:00 a.m. it will be allowed to drop to 21°, at 8:00 a.m. it will be allowed to drop to 17°, at 9:00 a.m. it will be allowed to drop to 10°. Similarly, at 5:00 p.m. the temperature will be increased to 15°at 6:00 p.m., to 17° and to 21° at 7:00 p.m.

The past activity memory chart described above is continuously updated by replacing the information relating to the oldest week with the information from the most recent week. Therefore, as habits change, the chart will more closely reflect the change each week and completely re-organize itself after the present period, preferably at least 5 weeks.

The control system may also be provided with further options to control the heating and cooling system. One preferred option may be to provide for up to one full interval time advance for the temperature setpoint. In this manner the determination of the anticipated occupancy status for the interval ahead would determine the present interval temperature setpoint. For example, in the above table, if the system detects the space is unoccupied and it is Monday at 7:00 a.m., the temperature control system utilizes the temperature setpoint for the hour interval of 8:00 a.m. which is 17°. Likewise at 6:00 p.m. the temperature control system utilizes the temperature setpoint for the interval of 7:00 p.m. which is 21°.

The microprocessor system is preferably also programmed so that when the house is occupied, the control system is inactivated and the temperature is maintained at the comfort level as expressed by the temperature setpoint of the highest occupancy status. The programmed instructions for automatically adjusting the temperature control are utilized only when the space is not occupied. In this way if, for example, a person is home from work sick, then the system will maintain the temperature at the comfort level overriding the programmed instructions.

For the night time hours, there may be provided a means for lowering the temperature in the space during these hours even though the system may be detecting that space is occupied. For example, the system may be programmed to decrease the temperature setpoint to a lower level during the hours of, for example, midnight and 6:00 a.m. Alternatively, the system may be provided with more than one detecting means such that the highest temperature setpoint is not achieved unless more than one detecting means detects occupancy of the space.

As the system may be provided with a clock and calendar means, then each day of the week may be separately stored to reflect the occupancy status of the space for that particular day. Thus, for example, on Saturday, Sundays and holidays when the house is more likely to be occupied, then the system programs for these days, thus eliminating the need for the user to manually override the system. Additionally, the calender means may be preprogrammed for set holidays such as Christmas so that it would know that the day is a holiday and thus automatically override the programming of the system.

As explained above, the system may also be provided with an option to vary the length of each individual cycle from the seven day period provided above. For example, if a person works on shift work one week on days and one week on evenings, the the system could be programmed to utilize a two week period as the basic cycle. Depending upon the habits of the persons occupying the space, the basic cycle could be varied from a few days to a month.

Another option that may be provided is a programmed instruction that, if the system does not detect any occupancy of the space for a period of a few days, the normal operation of the system would be overridden and the temperature would be reduced to the temperature setpoint value of an occupancy status of 0 until someone returns to occupy the space.

A preferred embodiment of the very simple thermostat control unit of the present invention is illustrated in FIG. 2 which shows a perspective view of the control unit generally indicated by the numeral 30. The control unit is housed in a casing preferably a plastic molded casing 32. The control unit illustrated in FIG. 2 utilizes 2 different detection means. A sound detector 34 located behind a grill 36 in the front of the casing 32 and light detectors 38A, 38B and 38C mounted on the front and either side of the case 32. A display unit 40 is provided to indicate the temperature of the space. The control unit 30 shown in FIG. 2 is a simple unit designed to have most of the parameter of the system such as the temperature setpoints, time intervals, length of cycle and number of cycles pre-programmed rather than user-programmed. Options of the pre-programmed parameter may be provided being selectable by DIP switches which are mounted on the circuit board of the control system (not shown) which is contained inside the case 32. These DIP switches would be accessible by removing the cover and could be utilized to select for example the time interval.

In operation, if the sound detector 34 or the light detector 38 detect occupancy of the space, then the control system operates as has been explained hereinabove. One advantage of utilizing 3 individual light detectors 38A, 38B and 38C on the sides and the front of the case 32 is that if all 3 detectors indicate approximately the same general light level, then the unit would assume that the space is not being occupied. If, however, there is a variation in the light level detected by one or more of the detectors such as for example a light shining on one or two of the detectors and the third detector being in shadow or if a person were to pass in front of one of the detectors thereby reducing the light level temporarily, then this would indicate to the control system that the space is occupied.

All the above embodiments have been described with reference to a household heating system. It will be readily appreciated that the system is easily adaptable to household air conditioning systems. In such cases the temperature setpoints would be reversed in that the fully occupied setpoint would be the lowest temperature and the fully unoccupied setpoint would be the highest temperature. Similarly, the system is easily adaptable to industrial or commercial applications where the space is occupied mainly during the daytime hours.

It will now be seen from the above how the present invention provides for a self-programming temperature control system for automatically adjusting the temperature control setpoint of a heating and cooling system of a space in accordance with the present or anticipated occupancy status of the space as represented by the past actual occupancy status of the space for the same time and day of week.

Although various preferred embodiments of the present invention have been described herein in detail, it will be appreciated by those skilled in the art that changes may be made thereto without departing from the spirit of the invention as described in the appended claims.

The embodiments of the invention in which an exclusive property or privilege is claimed are as follows:

1. A temperature control system for automatically adjusting the temperature control setpoint of a heating and cooling system of a space in accordance with the present or anticipated occupancy status of the space, said temperature control system comprising:
   a) detecting means for detecting the occupancy status of the space and providing an output of the occupancy status of the space;
   b) timing means for providing time intervals to the control system;
   c) storage means for storing the output of the detecting means in relation to the time interval provided by the timing means to provide a stored past occupancy record of the space; and
   d) programmed processor means including programmed instructions for reading and processing the past occupancy record of the space stored in the storage means to derive an anticipated occupancy status for the space and thereby control the temperature of the space in accordance with the programmed instructions and the stored past occupancy record of the space.

2. A temperature control system as claimed in claim 1 wherein said detecting means are one or more detecting means selected from the group consisting of light detecting means, motion detecting means, sound detecting means, door opening detecting means, means to monitor the flow of water through a plumbing system, and means to monitor voltage loads.

3. A temperature control system as claimed in claim 2 wherein said detecting means is adapted to detect abrupt changes in the monitored function.

4. A temperature control system as claimed in claim 1 wherein said timing means is a clock and calendar means for providing time and day of week information to the control system.

5. A temperature control system as claimed in claim 1 wherein said time interval is one hour or less.

6. A temperature control system as claimed in claim 1 wherein said past occupancy record includes the occupancy status of the space for at least the previous 3 weeks.

7. A temperature control system as claimed in claim 1 wherein said past occupancy record includes the occupancy status of the space for at least the previous 5 weeks.

8. A method for automatically adjusting the temperature control setpoint of an environmental temperature sustaining means for altering the temperature in a space and providing heating and cooling to the space in accordance with the anticipated occupancy status of the space, said method comprising:
   a) providing a temperature sensing means for sensing the ambient temperature in the space and providing an output of the sensed temperature of the space; a detecting means for detecting the occupancy status of the space and providing an output of the occupancy status of the space; timing means for providing a time interval to the control system; and programmed processor means including programmed instructions;
   b) the processor means being connected to the detecting means, the timing means and the storage means to allow monitoring and processing of the output of the detecting means in relation to the interval provided by the timing means in accordance with the programmed instructions to provide information on the past occupancy status of the space, the processor means further being so connected to allow storing of the information on the past occupancy status of the space in a storage means;
   c) the processor means retrieving the stored information on the past occupancy status of the space from the storage means for the time interval provided by the timing means and processing the information in accordance with the programmed instructions to provide an indication of the anticipated occupancy status of the space for the time interval, the processor means providing a signal to a environmental temperature sustaining means for altering the temperature in the space and providing heating and cooling in accordance with the anticipated occupancy status of the space.

9. A temperature control system as claimed in claim 8 wherein said detecting means are one or more detecting means selected from the group consisting of light detecting means, motion detecting means, sound detecting means, door opening detecting means, means to monitor the flow of water through a plumbing system, and means to monitor voltage loads.

10. A temperature control system as claimed in claim 9 wherein said detecting means is adapted to detect abrupt changes in the monitored function.

11. A temperature control system as claimed in claim 8 wherein said timing means is a clock and calendar means for providing time and day of week information to the control system.

12. A temperature control system as claimed in claim 8 wherein said time interval is one hour or less.

13. A temperature control system as claimed in claim 8 wherein said past occupancy record includes the occupancy status of the space for at least the previous 3 weeks.

14. A temperature control system as claimed in claim 8 wherein said past occupancy record includes the occupancy status of the space for at least the previous 5 weeks.

* * * * *